United States Patent
Zhao et al.

(10) Patent No.: US 11,125,583 B2
(45) Date of Patent: Sep. 21, 2021

(54) INTEGRATED DUAL ROTARY POSITION SENSOR

(71) Applicant: HAMLIN ELECTRONICS (SUZHOU) CO. LTD., Jiangsu (CN)

(72) Inventors: Jianfei Zhao, Suzhou (CN); Wei Zhou, Suzhou (CN)

(73) Assignee: SUZHOU LITTELFUSE OVS CO., LTD., Suzhou (CN)

( * ) Notice: Subject to any disclaimer, the term of this patent is extended or adjusted under 35 U.S.C. 154(b) by 0 days.

(21) Appl. No.: 16/332,985

(22) PCT Filed: Sep. 23, 2016

(86) PCT No.: PCT/CN2016/099847
§ 371 (c)(1),
(2) Date: Mar. 13, 2019

(87) PCT Pub. No.: WO2018/053793
PCT Pub. Date: Mar. 29, 2018

(65) Prior Publication Data
US 2019/0271570 A1    Sep. 5, 2019

(51) Int. Cl.
*G01D 5/14*     (2006.01)
*G01B 7/00*     (2006.01)
(Continued)

(52) U.S. Cl.
CPC ............. *G01D 5/145* (2013.01); *B60T 7/00* (2013.01); *G01B 7/003* (2013.01); *G01D 5/147* (2013.01); *G01D 11/245* (2013.01)

(58) Field of Classification Search
CPC ........ G01D 5/142; G01D 5/145; G01D 5/147; G01D 11/245; G01B 7/30; G01R 33/06–098
See application file for complete search history.

(56) References Cited

U.S. PATENT DOCUMENTS 3,742,243 A * 6/1973 Gamble ............... G01D 5/145
                                                    307/106
4,053,826 A * 10/1977 Wasawa ............. F02D 41/009
                                                    324/207.16
(Continued)

FOREIGN PATENT DOCUMENTS

CN       2828739 Y     10/2006
CN     101115981 A      1/2008
(Continued)

OTHER PUBLICATIONS

International Search Report from PCT/CN2016/099847 dated Jun. 27, 2017, 5 pages.
(Continued)

*Primary Examiner* — Patrick Assouad
*Assistant Examiner* — Demetrius R Pretlow
(74) *Attorney, Agent, or Firm* — Kacvinsky Daisak Bluni PLLC

(57) ABSTRACT

A rotary position sensor (102) includes a sensor housing (202) defining an interior cavity. A first rotor (206) may be positioned and rotatable within the interior cavity, and the first rotor (206) may at least partially define a bore (214) to receive a shaft (112) and include a first magnet (326). Furthermore, the rotary position sensor (102) may include a second rotor (208) positioned and rotatable within the interior cavity, and the second rotor (208) may at least partially define the bore (214) to receive the shaft (112) and include a second magnet (328). A ring element (304) may be disposed in the sensor housing (202), and the ring element (304) may be arranged between the first rotor (206) and the second rotor (208).

13 Claims, 3 Drawing Sheets

(51) Int. Cl.
  *G01D 11/24* (2006.01)
  *B60T 7/00* (2006.01)

(56) References Cited

U.S. PATENT DOCUMENTS

| | | | | |
|---|---|---|---|---|
| 6,341,426 B1* | 1/2002 | Okumura | | G01D 5/145 |
| | | | | 33/1 N |
| 6,725,734 B1* | 4/2004 | Toratani | | B62D 6/10 |
| | | | | 73/862 |
| 6,778,063 B1* | 8/2004 | Chen | | G01D 11/24 |
| | | | | 338/116 |
| 7,352,174 B1 | 4/2008 | Lee | | |
| 7,950,494 B2* | 5/2011 | Ishihara | | B62D 6/10 |
| | | | | 180/444 |
| 10,677,617 B2* | 6/2020 | Ausserlechner | | G01D 11/245 |
| 2003/0062890 A1 | 4/2003 | Tokumoto | | |
| 2003/0110847 A1 | 6/2003 | Kubo et al. | | |
| 2003/0173954 A1* | 9/2003 | Terui | | G01D 11/245 |
| | | | | 324/207.21 |
| 2004/0041572 A1 | 3/2004 | Lin et al. | | |
| 2004/0244209 A1* | 12/2004 | Uehira | | G01D 5/145 |
| | | | | 33/1 PT |
| 2006/0176050 A1 | 8/2006 | LaPlaca | | |
| 2007/0252585 A1* | 11/2007 | Narasimhan | | G01D 5/145 |
| | | | | 324/207.2 |
| 2009/0289623 A1* | 11/2009 | Sano | | G01B 7/30 |
| | | | | 324/207.25 |
| 2009/0315544 A1* | 12/2009 | Takahashi | | G01P 13/04 |
| | | | | 324/207.25 |
| 2010/0088062 A1* | 4/2010 | Hori | | G01D 5/2451 |
| | | | | 702/151 |
| 2010/0207616 A1* | 8/2010 | Wolschlager | | G01D 21/00 |
| | | | | 324/207.25 |
| 2010/0295541 A1* | 11/2010 | Sano | | G01D 5/145 |
| | | | | 324/207.25 |
| 2011/0303001 A1* | 12/2011 | Hirose | | G01L 5/221 |
| | | | | 73/117.02 |
| 2013/0298698 A1* | 11/2013 | Elliott | | G01L 3/104 |
| | | | | 73/862.325 |
| 2014/0246267 A1* | 9/2014 | Takayanagi | | B62D 5/0457 |
| | | | | 180/446 |
| 2014/0320120 A1* | 10/2014 | Klimenko | | G01B 7/30 |
| | | | | 324/207.25 |
| 2016/0146634 A1* | 5/2016 | Elpermann | | B62D 15/0215 |
| | | | | 324/207.15 |
| 2016/0195442 A1* | 7/2016 | Saito | | G01L 3/109 |
| | | | | 73/862.325 |
| 2017/0167891 A1* | 6/2017 | Maeda | | G01D 5/14 |

FOREIGN PATENT DOCUMENTS

| | | |
|---|---|---|
| CN | 201331352 Y | 10/2009 |
| CN | 102745229 A | 10/2012 |
| CN | 202770394 U | 3/2013 |
| CN | 103154671 A | 6/2013 |
| CN | 103487188 A | 1/2014 |
| CN | 103842786 A | 6/2014 |
| CN | 105765347 A | 7/2016 |
| EP | 1426750 A1 | 6/2004 |
| EP | 1589322 A1 | 10/2005 |
| JP | 2007285741 A | 11/2007 |
| WO | 2015141255 A1 | 9/2015 |

OTHER PUBLICATIONS

Written Opinion from PCT/CN2016/099847 dated Jun. 27, 2017, 4 pages.
Supplemental European Search Report dated Apr. 23, 2020 for EPO Application No. 16916532.1.

* cited by examiner

INTEGRATED DUAL ROTARY POSITION SENSOR

BACKGROUND

Field

The present disclosure generally relates to sensors. In particular, the present disclosure relates to rotary position sensors for sensing the position of controls in vehicular systems.

Description of Related Art

Rotary position sensors may be used in vehicles to sense the position of accelerator pedals, clutch pedals, brake pedals, throttle bodies, and other such controls in vehicular systems. Conventional rotary position sensors may use formed magnets to direct magnetic flux to one or more Hall-effect sensors to enable position sensing of various controls in vehicular systems.

Conventional rotary position sensors are functional to sense the position of a single control in a vehicular system (e.g., a single accelerator pedal or a single brake pedal). Therefore, a single conventional rotary position sensor is not capable of providing position information related to a plurality of vehicular controls that are in close proximity. More specifically, a conventional rotary position sensor must be associated with each vehicular control (e.g., accelerator pedal, clutch pedal, and brake pedal). Therefore, there is a need to provide a rotary position sensor that is capable of providing position information associated with a plurality of vehicular controls that are in close proximity.

Other problems with existing rotary position sensors will become apparent in view of the disclosure below.

SUMMARY

This Summary is provided to introduce a selection of concepts in a simplified form further described below in the Detailed Description. This Summary is not intended to identify key or essential features of the claimed subject matter, nor is this Summary intended as an aid in determining the scope of the claimed subject matter.

According to one implementation, a rotary position sensor may include a sensor housing. A first rotor may be disposed in the rotary position sensor housing, the first rotor individually rotatable in the rotary position sensor housing. Furthermore, a second rotor may be disposed in the rotary position sensor housing, the second rotor is also individually rotatable in the rotary position sensor housing.

According to another implementation, a rotary position sensor may include a sensor housing defining an interior cavity. A first rotor may be positioned and rotatable within the interior cavity, the first rotor at least partially defining a bore to receive a shaft, and the first rotor comprising a first magnet. Furthermore, the rotary position sensor may include a second rotor positioned and rotatable within the interior cavity, the second rotor at least partially defining the bore to receive the shaft, and the second rotor comprising a second magnet. A ring element may be disposed in the sensor housing, the ring element arranged between the first rotor and the second rotor.

DETAILED DESCRIPTION

Rotary position sensors are disclosed. In one implementation, a rotary position sensor includes a sensor housing. Two rotors may be disposed in the sensor housing. Each of the two rotors may be individually rotatable within the sensor housing, and each of the two rotors may include a magnet, such as a formed magnet. A sensor, such as a Hall-effect sensor, may be disposed within the sensor housing and positioned adjacent to the magnets. In one implementation, a first Hall-effect sensor is disposed adjacent to a first magnet of the magnets and a second Hall-effect sensor is disposed adjacent to a second magnet of the magnets. The Hall-effect sensor or sensors is adapted to sense the magnitude and direction of the magnetic field associated with the first and second magnets and generate an electrical signal in response to the magnetic fields sensed by the Hall-effect sensor. The rotary position sensor is functional to provide rotation data related to an apparatus coupled to a first rotor of the rotors. In one example, the apparatus is part of a first brake pedal arm. Furthermore, the rotary position sensor is functional to provide rotation data related to a second apparatus coupled to a second rotor of the rotors. In one example, the second apparatus is part of a second brake pedal arm.

Figure 1:
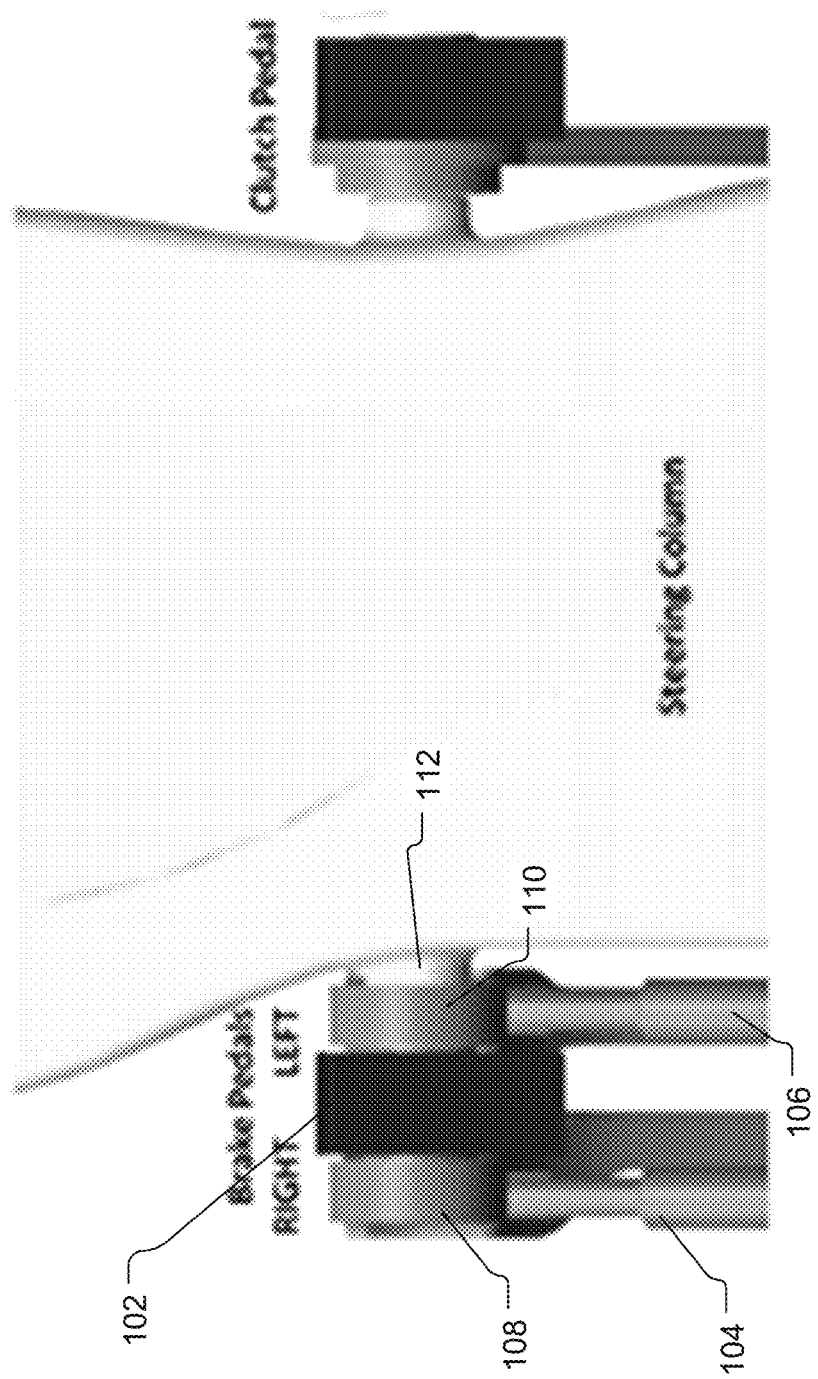
FIG. 1 illustrates an example use of a rotary position sensor that includes two rotary position sensors in one housing.

FIG. 1 illustrates an example use of a rotary position sensor 102 that includes two rotary position sensors in one housing. As is illustrated, the rotary position sensor 102 is coupled between a first brake pedal arm 104 that corresponds to a first brake pedal and a second brake pedal arm 106 that corresponds to a second brake pedal. A shaft 112 may extend at least through a bore or hole associated with the rotary position sensor 102. The first brake pedal arm 104 includes a flared brake arm portion 108 that is caused to rotate when the first brake pedal is engaged. The flared brake arm portion 108 is coupled to a first of the two rotary position sensors of the rotary position sensor 102. The second brake pedal arm 106 includes a flared brake arm portion 110 that is caused to rotate when the second brake pedal is actuated. The flared brake arm portion 110 is coupled to a second of the two rotary position sensors of the rotary position sensor 102.

Although FIG. 1 illustrates use of the rotary position sensor 102 in relation to a first brake pedal arm 104 and a second pedal arm 106, this is a non-limiting example. Specifically, the rotary position sensor 102 may be positioned between other rotatable elements, such as rotatable elements associated with clutches, throttle bodies, and the like.

Figure 2:
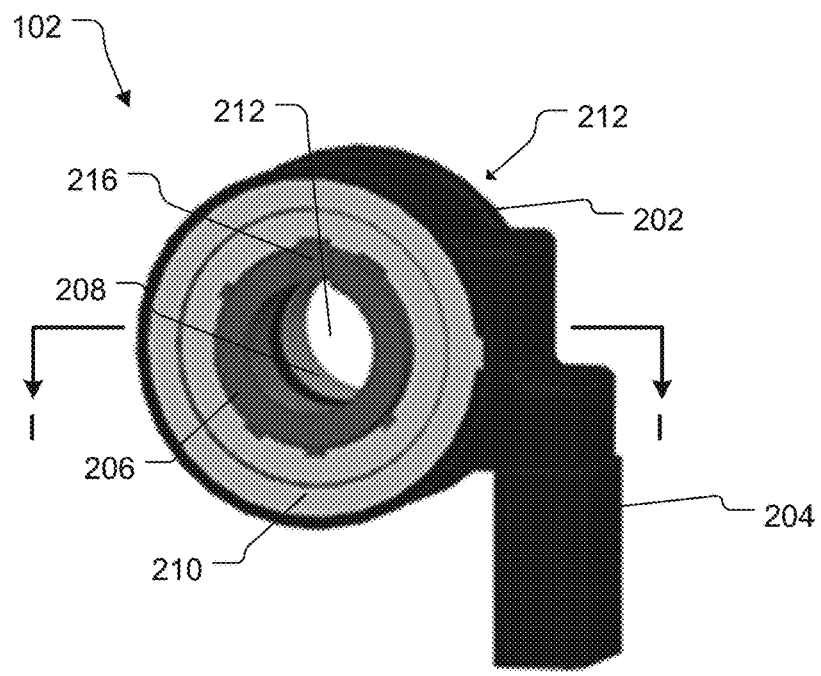
FIG. 2 illustrates a perspective view of the rotary position sensor.

FIG. 2 illustrates a perspective view of the rotary position sensor 102. The rotary position sensor 102 includes a rotary position sensor housing or sensor housing 202. The sensor housing 202 includes a plug portion 204 that enables connection of the rotary position sensor 102 to an electronic control unit or other computer or processor. The electronic control unit or other computer processor may be associated with a vehicular system, such as an automobile, agriculture or work machine, or the like.

A first rotor 206 may be disposed in the sensor housing 202. Furthermore, a second rotor 208 may be disposed within the sensor housing 202. Each of the first rotor 206 and the second rotor 208 is independently rotatable. For example, a rotatable element (e.g., the flared brake arm portion 108) may be coupled to the first rotor 206 to thereby cause rotation of the first rotor 206. Furthermore, a separate rotatable element (e.g., the flared brake arm portion 110) may be coupled to the second rotor 208 to thereby cause rotation of the second rotor 208. As is illustrated, a bore or hole 214 is defined through at least the first rotor 206 and the second rotor 208. The bore or hole 214 is to accommodate the shaft 112. The bore or hole 214 is an optional element of the rotary position sensor 102. Furthermore, a notch 216 is disposed on an exterior surface of the first rotor 206. A similar notch is also found on the second rotor 208. The notch 216 is designed to engage with a protrusion or key associated with the flared brake arm portion 108.

In one implementation, the rotary position sensor 102 includes a first cover 210 that is a positioned over at least a portion of the first rotor 206. Similarly, the rotary position sensor 102 includes a second cover 212 that is positioned over at least a portion of the second rotor 208. A view of the second cover 212 is provided in subsequent one or more figures associate with this disclosure.

Figure 3:
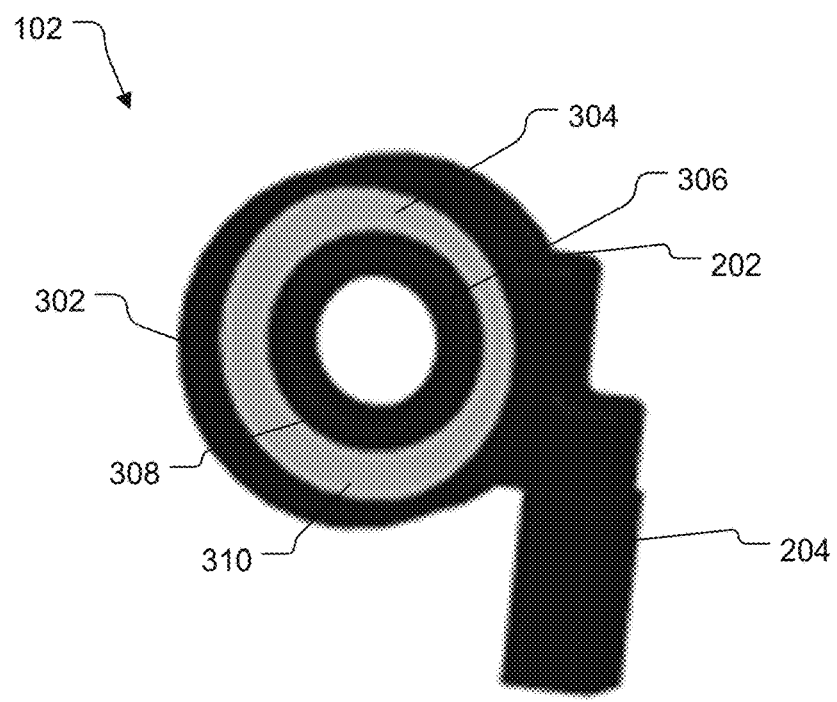
FIG. 3 illustrates another perspective view of the rotary position sensor.

FIG. 3 illustrates another perspective view of the rotary position sensor 102. In this view, the first rotor 206, the second rotor 208, the first cover 210 and the second cover 212 are not illustrated so that an interior cavity 302 of the rotary position sensor 102 is visible. As is shown, the rotary position sensor 102 includes a ring element 304 disposed within the interior cavity 302. The ring element 302 may be made of a ferromagnetic material, such as iron or the like. The ring element 302 functions to provide a magnetic field separation between the first rotor 206 and the second rotor 208. Moreover, the ring element 302 provides a dividing barrier between the first rotor 206 and the second rotor 208, to minimize friction between the first rotor 206 and the second rotor 208.

FIG. 3 further illustrates a center portion 306 that is part of the sensor housing 202. The center portion 306 engages at least a portion of an inner circumference 308 associated with the ring element 302. Furthermore, the interior cavity 302 of the sensor housing 202 engages at least a portion of an outer circumference 310 associated with the ring element 302. Therefore, the ring element 302 is held fixedly in place by the center portion 306 and the interior cavity 302 of the sensor housing 202.

Figure 4:
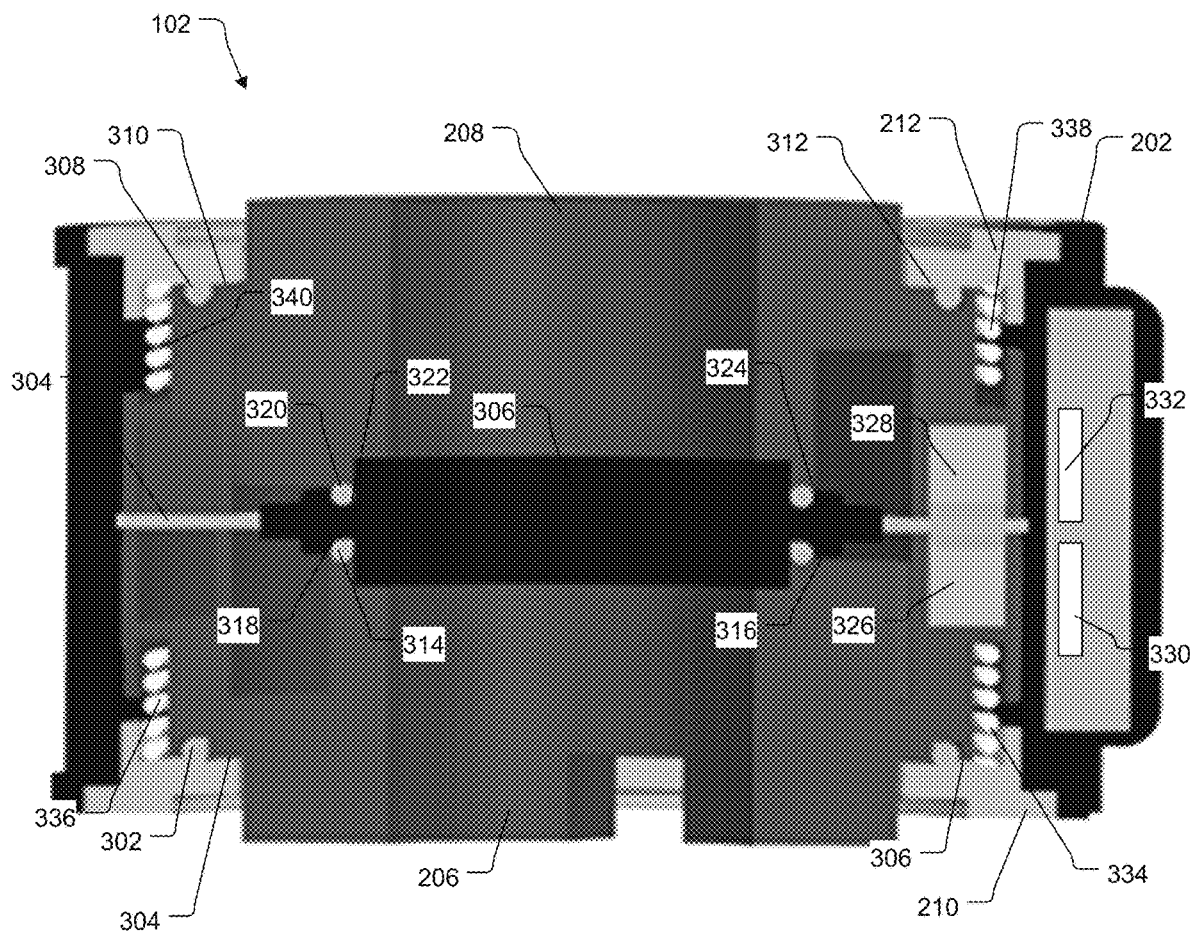
FIG. 4 illustrates a cross-section view of the rotary position sensor, as viewed from the perspective of line 14 shown in FIG. 2.

FIG. 4 illustrates a cross-section view of the rotary position sensor 102, as viewed from the perspective of line I-I shown in FIG. 2. As is illustrated, an o-ring 302, made of rubber, may be disposed on a face 304 of the first rotor 206. Therefore, the o-ring 302 is positioned between an interior surface 306 of the first cover 210 and the face 304 of the first rotor 206. The o-ring 302 is provided to mitigate against ingress of water and other external environmental elements, such as dust, chemicals, and the like. Similarly, an o-ring 308, made of rubber, may be disposed on a face 310 of the second rotor 208. Therefore, the o-ring 308 is positioned between an interior surface 312 of the second cover 212 and the face 310 of the second rotor 208. The o-ring 308 is provided to mitigate against ingress of water and other external environmental elements, such as dust, chemicals, and the like.

An o-ring 314 is disposed on a first surface 318 of the center portion 306. The o-ring 314 may be made of rubber. The o-ring 314 is positioned between the center portion 306 and an interior surface 316 of the first rotor 206. The o-ring 314 is provided to mitigate against ingress of water and other environmental elements, such as dust, chemicals, and the like. An o-ring 320 is disposed on a second surface 322 of the center portion 306. The o-ring 320 may be made of rubber. The o-ring 320 is positioned between the center portion 306 and an interior surface 324 of the second rotor 208. The o-ring 320 is provided to mitigate against ingress of water and other a environmental elements, such as dust, chemicals, and the like.

A magnet 326 may be associated with the first rotor 206. The magnet 326 may be contoured or formed to the shape of the first rotor 206, or contoured or formed to a portion of the shape of the first rotor 206. A magnet 328 may be associated with the second rotor 208. The magnet 308 may be contoured or formed to the shape of the second rotor 208, or contoured or formed to a portion of the shape of the second rotor 208.

Magnetic field sensors 330 and 332 may be housed within the sensor housing 202. In an alternative embodiment, in the place of the magnetic field sensors 330 and 332, a single magnetic field sensor may be housed within the sensor housing 202. The magnetic field sensors 330 and 332 may be Hall-effect sensors. The magnetic field sensors 330 and 332 may alternatively be Anisotropic Magneto-Resistive sensors, Giant magnetoresistance, and Tunnel magnetoresistance sensors.

The magnetic field sensor 330 produces an electrical output signal that changes in response to the position of the magnet 326. The position of the magnet 326 will change as the rotor 206 is rotated. As the magnetic, field (i.e., magnitude/strength and polarity/direction) generated by the magnet 326 varies with rotation the rotor 206, the electrical output signal produced by the magnetic, field sensor 330 changes accordingly, thus allowing the position the rotor 206 to be determined or ascertained and accordingly the position of flared brake arm portion 108 coupled to the rotor 206 to be determined or ascertained. The magnetic field sensor 330 senses the changing magnetic field (i.e., magnitude/strength and polarity/direction) as the magnet 326 is rotated in one embodiment, the electrical signal produced by the magnetic field sensor 330 is proportional to the position of the flared brake arm portion 108.

Similarly, the magnetic field sensor 332 produces an electrical output signal that changes in response to the position of the magnet 328. The position of the magnet 328 will change as the rotor 208 is rotated. As the magnetic field (i.e., magnitude/strength and polarity/direction) generated by the magnet 328 varies with rotation the rotor 208, the electrical output signal produced by the magnetic field sensor 332 changes accordingly, thus allowing the position the rotor 208 to be determined or ascertained and accordingly the position of flared brake arm portion 110 coupled to the rotor 208 to be determined or ascertained. The magnetic field sensor 332 senses the changing magnetic field (i.e., magnitude/strength and polarity/direction) as the magnet 328 is rotated. In one embodiment, the electrical signal produced by the magnetic field sensor 332 is proportional to the position of the flared brake arm portion 110.

As further illustrated in FIG. 4, a spring 334 is disposed in a slot 336 defined by the first rotor 206 and the first cover 210. The spring 334 is functional to bias the first rotor 206 to a predetermined initial position. Furthermore, a spring 338 is disposed in a slot 340 defined by the second rotor 208 and the first cover 212. The spring 3 and 38 is functional to bias the first rotor 208 to a predetermined initial position.

While exemplary rotary position sensors are disclosed, it will be understood by those skilled in the art that various changes may be made and equivalents may be substituted without departing from the spirit and scope of the claims of the application. Other modifications may be made to adapt a particular situation or material to the teachings disclosed above without departing from the scope of the claims. There ore, the claims should not be construed as being limited to any one of the particular embodiments disclosed, but to any embodiments that fall within the scope of the claims.

We claim:

1. An apparatus, comprising:
   a rotary position sensor housing having an annular center portion defining a bore adapted to receive a shaft;
   a first rotor disposed in the rotary position sensor housing on a first side of, and coaxial with, the center portion, the first rotor individually rotatable in the rotary position sensor housing;
   a second rotor disposed in the rotary position sensor housing on a second side of, and coaxial with, the center portion, the second rotor individually rotatable in the rotary position sensor housing;
   a ring element disposed within the rotary position sensor housing between the first rotor and the second rotor, an inner circumference of the ring element engaging the center portion, and an outer circumference of the ring element engaging an interior of the rotary position sensor housing;
   a first cover positioned over at least a portion of the first rotor disposed in the rotary position sensor housing and an o-ring disposed between the first cover and the first rotor; and
   a second cover positioned over at least a portion of the second rotor disposed in the rotary position sensor housing and another o-ring disposed between the second cover and the second rotor.

2. The apparatus according to claim 1, wherein the ring element comprises a ferromagnetic material.

3. The apparatus according to claim 1, wherein the center portion includes a first face and a second face, each of the first face and the second face comprising an o-ring coupled thereto.

4. The apparatus according to claim 1, wherein the first rotor includes a first magnet and the second rotor includes a second magnet.

5. The apparatus according to claim 4, further comprising a first Hall-effect sensor positioned adjacent to the first magnet and a second Hall-effect sensor positioned adjacent to the second magnet.

6. The apparatus according to claim 1, further comprising first and second springs disposed in the rotary position sensor housing, the first spring coupled to the rotary position sensor housing and positioned between the rotary position sensor housing and the first rotor and the second spring coupled to the rotary position sensor housing and positioned between the rotary housing and the second rotor.

7. The apparatus according to claim 1, wherein each of the first and second rotors includes a notch on an outward facing surface thereof.

8. An apparatus, comprising:
   a sensor housing defining an interior cavity and having an annular center portion defining a bore adapted to receive a shaft;
   a first rotor positioned and rotatable within the interior cavity, the first rotor at least partially defining the bore to receive the shaft, and the first rotor comprising a first magnet;
   a second rotor positioned and rotatable within the interior cavity, the second rotor at least partially defining the bore to receive the shaft, and the second rotor comprising a second magnet;
   a ring element disposed in the sensor housing, the ring element arranged between the first rotor and the second rotor, an inner circumference of the ring element engaging the center portion, and an outer circumference of the ring element engaging an interior of the sensor housing; and
   a first cover positioned over at least a portion of the first rotor disposed in the sensor housing and an o-ring disposed between the first cover and the first rotor, and a second cover positioned over at least a portion of the second rotor disposed in the sensor housing and another o-ring disposed between the second cover and the second rotor.

9. The apparatus according to claim 8, wherein the ring element comprises a ferromagnetic material.

10. The apparatus according to claim 8, the center portion including a first face and a second face, each of the first face and the second face comprising an o-ring coupled thereto.

11. The apparatus according to claim 8, further comprising a first Hall-effect sensor positioned adjacent to the first magnet and a second Hall-effect sensor positioned adjacent to the second magnet.

12. The apparatus according to claim 8, further comprising first and second springs disposed in the rotary position sensor housing, the first spring coupled to the sensor housing and positioned between the sensor housing and the first rotor and the second spring coupled to the sensor housing and positioned between the sensor housing and the second rotor.

13. The apparatus according to claim 8, wherein each of the first and second rotors includes a notch on an outward facing surface thereof.

* * * * *